United States Patent
Patel et al.

(10) Patent No.: US 10,093,158 B2
(45) Date of Patent: Oct. 9, 2018

(54) SUPPLEMENTAL LOAD TRANSFER TRIM SYSTEM

(71) Applicant: FORD GLOBAL TECHNOLOGIES, LLC, Dearborn, MI (US)

(72) Inventors: Deepak Patel, Canton, MI (US); Satyanarayana Raju Vemulapati, Westland, MI (US); Djamal Eddine Midoun, Ann Arbor, MI (US); Keith William Jenkins, Plymouth, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 21 days.

(21) Appl. No.: 15/332,405

(22) Filed: Oct. 24, 2016

(65) Prior Publication Data

US 2018/0111453 A1    Apr. 26, 2018

(51) Int. Cl.
*B60J 5/04*    (2006.01)
*B62D 25/20*   (2006.01)

(52) U.S. Cl.
CPC ........... *B60J 5/0451* (2013.01); *B60J 5/0455* (2013.01); *B60J 5/0456* (2013.01); *B62D 25/2036* (2013.01)

(58) Field of Classification Search
CPC ............................ B62D 25/2036; B60J 5/0451
USPC .... 296/187.12, 203.03, 146.6, 146.7, 193.02
See application file for complete search history.

(56) References Cited

U.S. PATENT DOCUMENTS

| | | | |
|---|---|---|---|
| 5,857,702 A | 1/1999 | Suga et al. | |
| 6,299,238 B1* | 10/2001 | Takagi | B60N 2/4235 296/187.12 |
| 6,299,239 B1* | 10/2001 | Sagawa | B60N 2/4235 296/187.12 |
| 6,955,391 B1* | 10/2005 | Peng | B60R 21/0428 280/751 |
| 8,029,041 B2 | 10/2011 | Hall et al. | |

(Continued)

FOREIGN PATENT DOCUMENTS

| | | |
|---|---|---|
| JP | 0811540 A | 1/1996 |
| JP | 2008174174 A | 7/2008 |
| JP | 5598693 B2 | 10/2014 |

OTHER PUBLICATIONS

English Machine Translation for JP0811540A.
English Machine Translation for JP2008174174A.
English Machine Translation for JP5598693B2.

*Primary Examiner* — Jason S Morrow
(74) *Attorney, Agent, or Firm* — Vichit Chea; King & Schickli PLLC

(57) ABSTRACT

A supplemental load transfer system for a vehicle includes a vehicle kick-up cross-member and a door trim panel configured to attach to a vehicle door member. The door trim panel includes a pusher disposed to transfer an impact load to the kick-up cross-member. The pusher may be configured as a matrix formed by a plurality of columns and substantially orthogonal connecting ribs to define a plurality of receivers. One or more of the receivers may be at least partially filled with a load-transferring substrate. The one or more receivers may be disposed at a bottom portion of the pusher. One or more columns of the plurality of columns may be oriented whereby an impact-receiving end and an impact-transmitting end of the pusher define different surface areas.

20 Claims, 2 Drawing Sheets

(56) References Cited

U.S. PATENT DOCUMENTS

| | | | | |
|---|---|---|---|---|
| 8,033,602 B2* | 10/2011 | Yamaki | ............... | B60N 2/4249 |
| | | | | 297/216.13 |
| 8,366,146 B2* | 2/2013 | Yamaki | ............... | B60N 2/4235 |
| | | | | 280/730.2 |
| 9,238,484 B2 | 1/2016 | Jenkins et al. | | |
| 9,321,331 B2* | 4/2016 | Hasegawa | .............. | B60J 5/0427 |
| 2005/0248180 A1* | 11/2005 | Campo Barasoain | ...................... | |
| | | | | B60R 21/0428 |
| | | | | 296/146.6 |
| 2006/0202513 A1* | 9/2006 | Matsuda | .............. | B60N 2/4235 |
| | | | | 296/187.12 |
| 2009/0256391 A1* | 10/2009 | Hall | ....................... | B60J 5/0451 |
| | | | | 296/187.12 |
| 2011/0057477 A1* | 3/2011 | Yamaki | ............... | B60N 2/4235 |
| | | | | 296/187.12 |
| 2015/0123423 A1* | 5/2015 | Hasegawa | .............. | B60J 5/0427 |
| | | | | 296/146.6 |
| 2015/0314808 A1* | 11/2015 | Jenkins | ................ | B62D 21/157 |
| | | | | 296/187.12 |
| 2016/0244100 A1* | 8/2016 | Hasegawa | .............. | B60J 5/0425 |
| 2017/0036700 A1* | 2/2017 | Patel | ................... | B62D 21/157 |

* cited by examiner

SUPPLEMENTAL LOAD TRANSFER TRIM SYSTEM

TECHNICAL FIELD

This disclosure relates generally to load transfer systems for vehicles. More particularly, the disclosure relates to a supplemental load transfer system associated with a vehicle door trim panel.

BACKGROUND

Side impacts to vehicles typically impose a dynamic load onto the vehicle and vehicle occupant. This places a severe stress on the occupant's body. For this reason, vehicles are designed to at least partially direct/re-direct lateral and other impact forces, for example such as are encountered in a side collision with a vehicle or other object, away from the vehicle passenger cabin area. In that regard, it is known to provide pushers designed to re-direct impact forces to a vehicle frame rail, to lessen intrusion of impact loads into a passenger cabin of a vehicle.

The present disclosure relates to a supplemental load transfer trim system designed to transfer energy/load and reduce passenger door intrusion into a vehicle passenger cabin resulting from an impact such as a side impact to a vehicle door.

SUMMARY

In accordance with the purposes and benefits described herein, in one aspect of the present disclosure a supplemental load transfer system for a vehicle is provided, comprising a vehicle kick-up cross-member; and a door trim panel configured to attach to a vehicle door member and comprising a pusher disposed to transfer an impact load to the kick-up cross-member. The pusher may be configured as a matrix formed by a plurality of columns and substantially orthogonal connecting ribs to define a plurality of receivers.

In embodiments, certain receivers of the plurality of receivers are filled with a load-transferring substrate. Different receivers may be at least partially filled with load-transferring substrates having a same or a different load-transferring capacity. In an embodiment, receivers disposed at a bottom portion of the pusher may be at least partially filled with a load-transferring substrate to confer a different load-transferring capacity to a top and a bottom portion of the pusher.

In other embodiments, certain receivers disposed in a bottom portion of the pusher may be at least partially filled with a first load-transferring substrate having a different load-transferring capacity from a second load-transferring substrate at least partially filling other receivers disposed in the bottom portion of the pusher. In this embodiment, different areas of the bottom portion of the pusher have different load-transferring capacities.

In embodiments, the plurality of columns is aligned whereby an impact-receiving end of the pusher defines a greater surface area than an impact-transmitting end of the pusher. In other embodiments, the plurality of columns is aligned whereby an impact-receiving end of the pusher defines a lesser surface area than an impact-transmitting end of the pusher.

In another aspect, a vehicle is described comprising a frame including a kick-up cross-member and a door comprising an outer panel, an inner panel, and a door trim panel. The door trim panel comprises a pusher as described above.

In still another aspect, a vehicle door member is described, comprising a frame, an outer panel, and an inner panel. The door assembly includes a door trim panel as described above.

In the following description, there are shown and described embodiments of the disclosed supplemental load transfer trim system, and of doors including same. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed supplemental load transfer trim system, and together with the description serve to explain certain principles thereof. In the drawing.

Reference will now be made in detail to embodiments of the disclosed supplemental load transfer trim system, examples of which are illustrated in the accompanying drawing figures.

DETAILED DESCRIPTION

Figure 1:
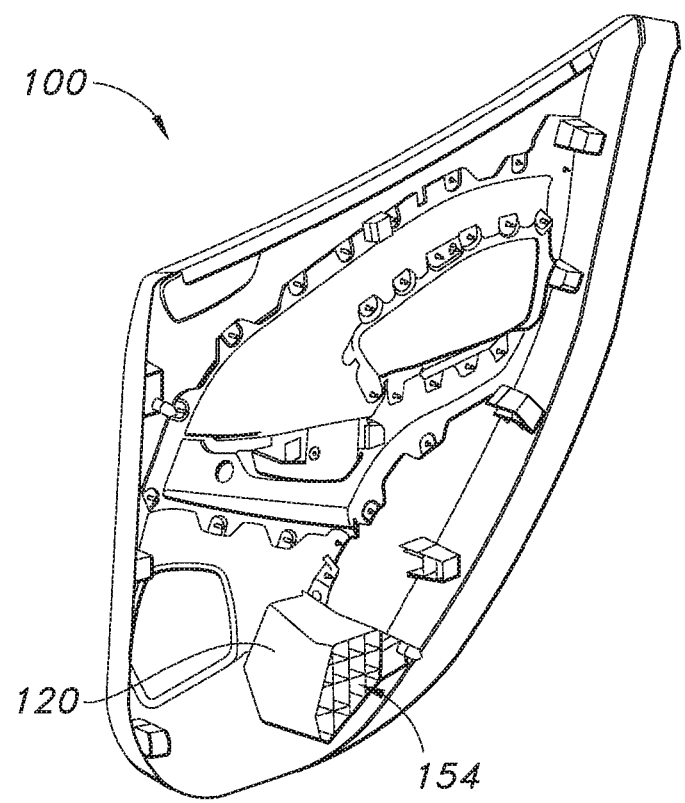
FIG. 1 depicts a vehicle-inward perspective view of a door trim panel for use with a supplemental load transfer trim system according to the present disclosure.

FIG. 1 shows a door trim panel 100 having a vehicle door member-facing surface 110 configured to matingly fasten to a door panel (not shown in this view). The door trim panel 100 further includes a pusher 120 disposed on the door member-facing surface 110.

Figure 2:
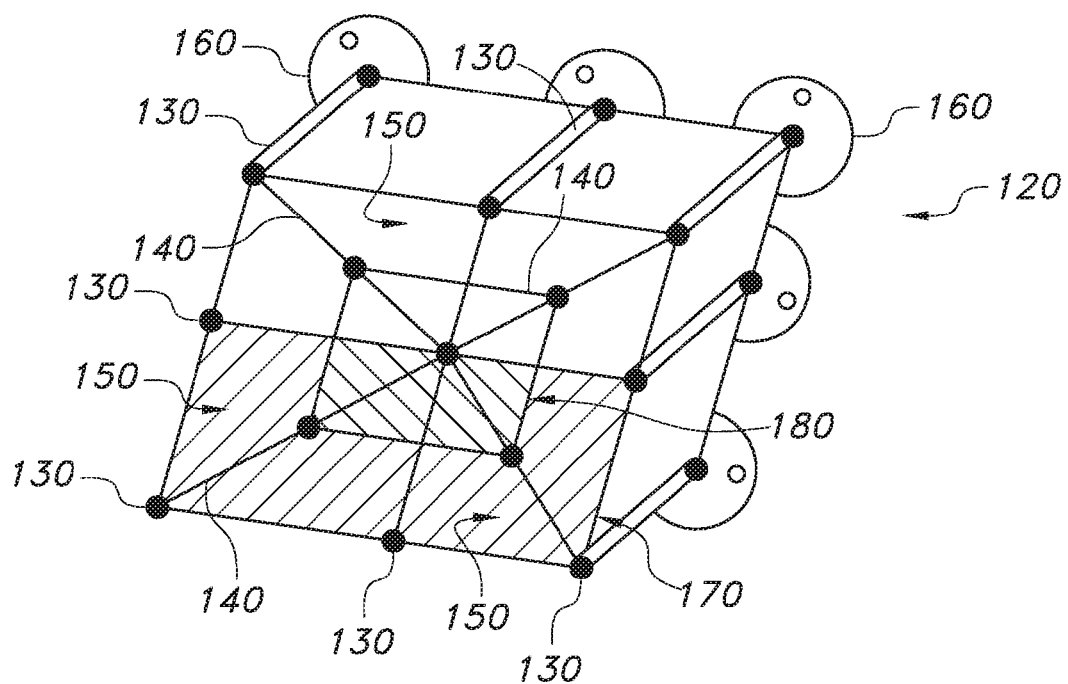
FIG. 2 shows an isolated front perspective view of a pusher associated with the door trim panel of FIG. 1.

With reference to FIG. 2, the pusher 120 includes a plurality of columns 130 arranged in a matrix or grid, and interconnected by a plurality of substantially orthogonal ribs 140. As will be appreciated, this arrangement defines a plurality of receivers 150. In the depicted embodiment, the pusher 120 includes a plurality of attachment points 160 to allow coupling the pusher to the vehicle door member-facing surface 110. However, it is also contemplated to provide the pusher 120 as an integral portion of the door member-facing surface 110, for example by molding or otherwise fabricating the components as a unit.

It will be appreciated that a thickness/diameter of one or more of the columns 130 may be altered or "tuned" to in turn alter a stiffness and enhance a loading capacity of the pusher 120. Likewise, a thickness/diameter of one or more of the ribs 140 may be altered or "tuned."

In turn, by altering an orientation or angle of one or more of the columns 130 and the pusher side wall surface angles, a configuration of the pusher 120 may be altered to alter loading capacity and/or load-transferring capacity of the pusher. For example, as shown in FIG. 1 the pusher 120 is configured whereby a vehicle-outward facing or impact-receiving end 152 of the pusher 120 defines a lesser surface area than a vehicle-inward facing or impact-transferring end 154 of the pusher. Alternatively, the column 130/pusher 120 side wall surface angles may be altered to configure the pusher whereby the vehicle-outward facing end of the pusher 120 defines a greater surface area than a vehicle-inward facing end (embodiment not shown).

One or more of the receivers 150 may be at least partially filled with a load-absorbing and/or load-transferring substrate thereby stiffening the entirety or portions of the pusher 120, and providing a desired load-transferring capacity to the pusher structure. The substrate may be any suitable load-transferring substrate, including without intending any limitation plastics, polymers, rubbers, resins, combinations thereof, and other substantially sturdy materials. As will be appreciated, various of the receivers may be at least partially filled with the same or different load-absorbing and/or load-transferring substrates to provide different zones having a same or different load-absorbing/load-transferring properties.

In the embodiment of FIG. 2, receivers 150 located in a first zone 170 are at least partially filled with a first substrate having a thickness and/or load-absorbing and/or load-transferring property, and receivers 150 located in a second zone 180 are at least partially filled with a second substrate having a different thickness and/or load-absorbing and/or load-transferring property. Alternatively, receivers 150 disposed in the second zone 180 may be fully filled with a substrate, and receivers 150 disposed in the first zone 170 may not be filled, or may contain a lesser volume of a same substrate, thus altering their load-absorbing and/or load-transferring capabilities. In the depicted embodiment, the first zone 170 and the second zone 180 are both disposed in different regions of a lower portion of the pusher 120. As will be appreciated, this alters the load-transferring properties of the pusher 120 by guiding a load imposed by a side impact to transfer downwardly and laterally to contact a frame element associated with the vehicle (see description below).

Figure 3:
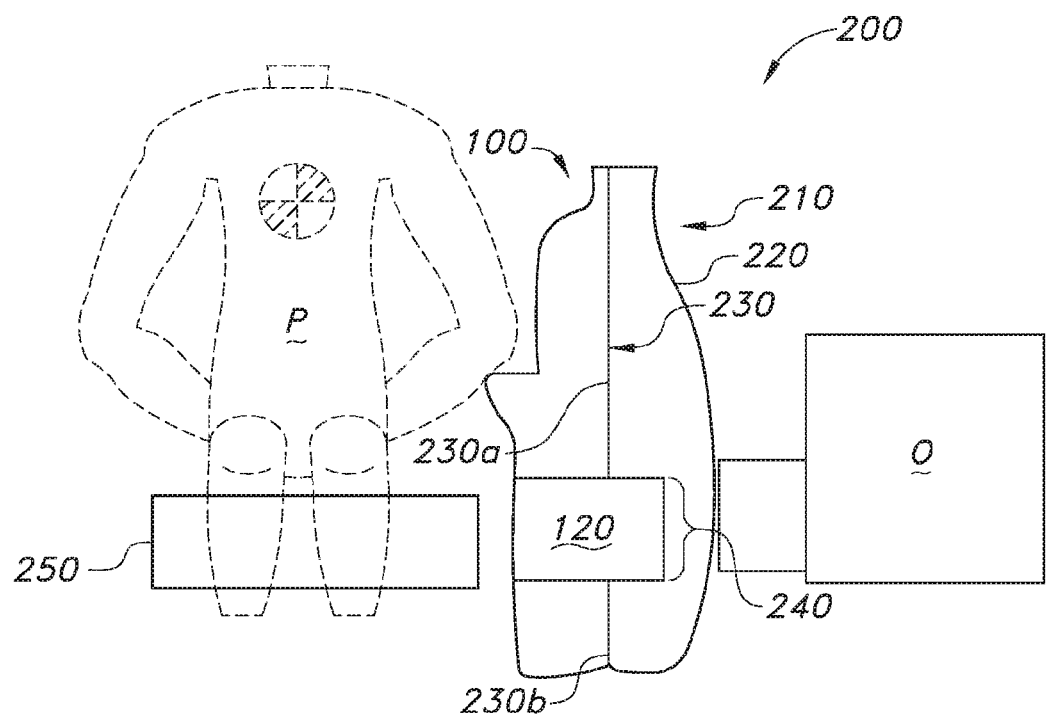
FIG. 3 depicts a supplemental load transfer trim system according to the present disclosure in an idle state.

The described door trim panel 100/pusher 120 in embodiments form a part of a supplemental load transfer system 200. With reference to FIG. 3, the door trim panel 100 is shown incorporated into a vehicle door member 210 defined by an outer panel 220, an inner panel 230, and a door beam 240. As shown, the inner door panel 230 is provided as segments 230a, 230b defining a gap therebetween through which the pusher 120 extends in a vehicle-outward facing orientation, substantially aligned with but held at a spaced distanced from the door beam 240. In an assembled vehicle, the pusher 120 is likewise substantially aligned with a vehicle underbody kick-up cross-member 250 which underlies a vehicle seat (not shown) on which a passenger P may be seated. In the drawing figure, the supplemental load transfer system 200 is in an idle state, i.e. has not been impacted such as by a side impact from an object O. This object O can be a side impact barrier including a barrier bumper, another vehicle, a roadside obstacle, etc.

It is contemplated to alter columns 130 and/or pusher 120 side wall surface angles according to ingress/egress. That is, depending on vehicle configuration, the underbody kick-up cross-member 250 may not be aligned in a collinear plane with pusher 120/columns 130. Rather, the pusher 120/columns 130 may be angled/skewed to improve ease of entry into/exit from the vehicle by passengers.

Figure 4:
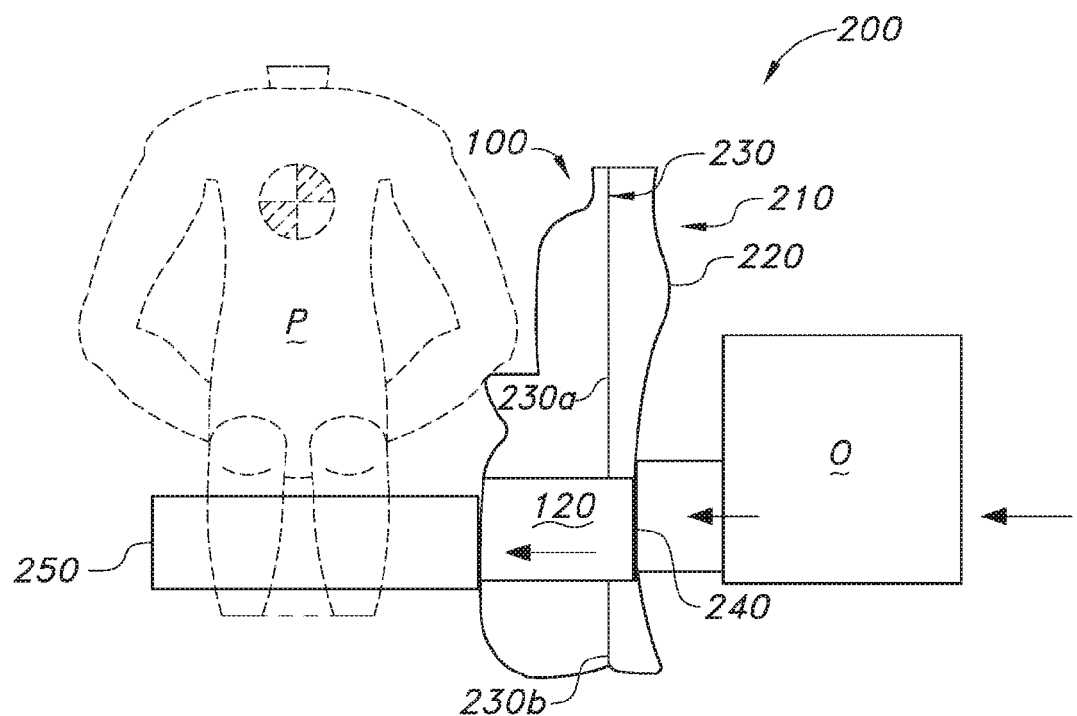
FIG. 4 depicts the supplemental load transfer trim system after receiving an impact.

Turning to FIG. 4, the supplemental load transfer system 200 is shown in use. On initial receipt of a side impact (see arrows), the vehicle door outer panel 220 and door beam 240 intrude vehicle inwardly until contact is made with the pusher 120. The pusher 120 acts as a wet-side pusher, being translated vehicle-inwardly whereby the door trim panel 100/pusher 120 contact the vehicle underbody kick-up cross-member 250. The pusher 120 may be configured as described above to taper towards the impact-transferring end 152 of the pusher, thus directing the side impact load downwardly to the vehicle underbody kick-up cross-member and transferring substantial portions of the side impact load away from the passenger cabin and passenger P seated therein.

In turn, because the pusher 120 is not connected to any structural element of the door member 210 (outer panel 220, inner panel 230, door beam 240, etc.), among other advantages a side or other impact load is not initially transferred to the vehicle door inner panel 230. It will be appreciated that by selecting particular column 130/rib 140 thicknesses and particular substrates/combinations of substrates contained in receivers 150, the load-transmitting properties of the supplemental load transfer system 200 can be tailored to transmit a desired load and direction of load to the underbody kick-up cross-member 250.

As will be appreciated, the described supplemental load transfer trim system defines an additional load transfer path in a vehicle, assisting in reducing vehicle door/impacting object intrusion into the vehicle and reducing load imposed on a passenger seated in a passenger cabin of the vehicle in the event of an impact such as a side impact. The described supplemental load transfer trim system acts as a wet side pusher but does not require attachment to a vehicle door/door beam as in prior art systems. In turn, on receipt of a side or other impact the described supplemental load transfer trim system does not load an inner panel of an impacted vehicle door, but rather moves independently of that inner panel to transfer load.

Obvious modifications and variations are possible in light of the above teachings. For example, while the disclosure discusses alignment of pusher 120 with a vehicle underbody kick-up cross-member 250, the skilled artisan will appreciate that the described pusher 120 is readily usable with other types of vehicle frame members. All such modifications and variations are within the scope of the appended claims when interpreted in accordance with the breadth to which they are fairly, legally and equitably entitled.

What is claimed:

1. A supplemental load transfer system for a vehicle, comprising:
    a vehicle kick-up cross-member; and
    a door trim panel configured to attach to a vehicle door member and comprising a pusher disposed to transfer an impact load to the kick-up cross-member;
    wherein the pusher is not directly connected to any structural element of the vehicle door member.

2. The supplemental load transfer system of claim 1, wherein the pusher is configured as a matrix formed by a plurality of columns and substantially orthogonal connecting ribs to define a plurality of receivers;
    further wherein at least a portion of the plurality of receivers is at least partially filled with a load-transferring substrate.

3. The supplemental load transfer system of claim 2, wherein one or more receivers of the plurality of receivers disposed at a lower portion of the pusher are at least partially filled with the load-transferring substrate.

4. The supplemental load transfer system of claim 3, wherein a first set of receivers disposed at the lower portion of the pusher is at least partially filled with a first load-transferring substrate and a second set of receivers disposed at the lower portion of the pusher is at least partially filled with a second load-transferring substrate;

further wherein the first load-transferring substrate confers a different load-transferring capacity from the second load-transferring substrate.

5. The supplemental load transfer system of claim 2, wherein one or more columns of the plurality of columns are oriented whereby an impact-receiving end of the pusher defines a greater surface area than an impact-transmitting end of the pusher.

6. The supplemental load transfer system of claim 2, wherein one or more columns of the plurality of columns are oriented whereby an impact-receiving end of the pusher defines a lesser surface area than an impact-transmitting end of the pusher.

7. A vehicle including the supplemental load transfer system of claim 1.

8. A vehicle, comprising:
a frame including a kick-up cross-member; and
a door comprising an outer panel, an inner panel, and a door trim panel;
wherein the door trim panel comprises a pusher traversing the inner panel and disposed to transfer an impact load to the kick-up cross-member;
further wherein the pusher is not directly connected to the outer panel and the inner panel.

9. The vehicle of claim 8, wherein the pusher is configured as a matrix formed by a plurality of columns and substantially orthogonal connecting ribs to define a plurality of receivers;
further wherein at least a portion of the plurality of receivers is at least partially filled with a load-transferring substrate.

10. The vehicle of claim 9, wherein one or more receivers of the plurality of receivers disposed at a lower portion of the pusher are at least partially filled with the load-transferring substrate.

11. The vehicle of claim 10, wherein a first set of receivers disposed at the lower portion of the pusher is at least partially filled with a first load-transferring substrate and a second set of receivers disposed at the lower portion of the pusher is at least partially filled with a second load-transferring substrate;
further wherein the first load-transferring substrate confers a different load-transferring capacity from the second load-transferring substrate.

12. The vehicle of claim 9 wherein one or more columns of the plurality of columns are oriented whereby an impact-receiving end of the pusher defines a greater surface area than an impact-transmitting end of the pusher.

13. The vehicle of claim 9, wherein one or more columns of the plurality of columns are oriented whereby an impact-receiving end of the pusher defines a lesser surface area than an impact-transmitting end of the pusher.

14. A vehicle door member, comprising:
a frame;
an outer panel;
an inner panel; and
a door trim panel comprising a pusher traversing the inner panel and disposed to transfer an impact load to a kick-up cross-member of a vehicle with which the vehicle door member is attached;
wherein the pusher is not directly connected to the outer panel and the inner panel.

15. The vehicle door member of claim 14, wherein the pusher is configured as a matrix formed by a plurality of columns and substantially orthogonal connecting ribs to define a plurality of receivers;
further wherein at least a portion of the plurality of receivers is at least partially filled with a load-transferring substrate.

16. The vehicle door member of claim 15, wherein one or more receivers of the plurality of receivers disposed at a lower portion of the pusher are at least partially filled with the load-transferring substrate.

17. The vehicle door member of claim 16, wherein a first set of receivers disposed at the lower portion of the pusher is at least partially filled with a first load-transferring substrate and a second set of receivers disposed at the lower portion of the pusher is at least partially filled with a second load-transferring substrate;
further wherein the first load-transferring substrate confers a different load-transferring capacity from the second load-transferring substrate.

18. The vehicle door member of claim 15, wherein one or more columns of the plurality of columns are oriented whereby an impact-receiving end of the pusher defines a greater surface area than an impact-transmitting end of the pusher.

19. The vehicle door member of claim 15, wherein one or more columns of the plurality of columns are oriented whereby an impact-receiving end of the pusher defines a lesser surface area than an impact-transmitting end of the pusher.

20. A vehicle including the vehicle door member of claim 14.

* * * * *